US009635372B2

United States Patent
Nakagawa

(10) Patent No.: US 9,635,372 B2
(45) Date of Patent: Apr. 25, 2017

(54) CODING FORMAT CONVERTER PARTIALLY HALTING SEARCH FOR CODING CANDIDATES

(71) Applicant: Oki Electric Industry Co., Ltd., Tokyo (JP)

(72) Inventor: Satoshi Nakagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 297 days.

(21) Appl. No.: 14/600,682

(22) Filed: Jan. 20, 2015

(65) Prior Publication Data

US 2015/0281730 A1   Oct. 1, 2015

(30) Foreign Application Priority Data

Mar. 26, 2014   (JP) .................................. 2014-064164

(51) Int. Cl.
  *H04N 19/40* (2014.01)
  *H04N 19/513* (2014.01)
(52) U.S. Cl.
  CPC .......... *H04N 19/40* (2014.11); *H04N 19/513* (2014.11)
(58) Field of Classification Search
  CPC ...... H04N 19/40; H04N 19/513; H04N 67/02; A63F 13/24; G06K 1/00; G06K 2207/00
  USPC .......................... 375/240.03, 240.21, 240.16
  See application file for complete search history.

(56) References Cited

U.S. PATENT DOCUMENTS

| 7,526,027 B2 | 4/2009 | Sekiguchi et al. |
| 2008/0198926 A1* | 8/2008 | Bordes ................ H04N 19/619 375/240.03 |
| 2016/0277761 A1* | 9/2016 | Li ........................ H04N 19/105 |

OTHER PUBLICATIONS

K. Choi et al., "Coding Tree Pruning Based CU Early Termination", JCTVC-F092, Jul. 2011, (http: I /phenix. itsudparis.eu/jct/doc__end_user//current document.php?id=2555), Referred to in Paragraph 0010 of the Specification.

(Continued)

*Primary Examiner* — Behrooz Senfi
(74) *Attorney, Agent, or Firm* — Rabin & Berdo, P.C.

(57) ABSTRACT

A coding format converter for converting an input stream of data of pictures of a first coding format into a data stream of data of pictures with a second coding format includes a decoder decoding the input stream with the first coding format, an encoder encoding the data of the picture thus decoding with the second coding format, a coding candidate search controller using first information on prediction residual availability indicative of whether or not residual information is encoded for each block in the decoded picture. When a search for coding candidates reveals a result that the first information for a coding target region of the picture is indicative of the absence of a residual, the controller refrains from searching for coding candidates which depend on second information on residual availability of the coding with the second coding format.

8 Claims, 3 Drawing Sheets

(56) References Cited

OTHER PUBLICATIONS

R.H. Gweon et al., "Early Termination of CU Encoding to Reduce HEVC Complexity", JCTVC-F045, Jul. 2011, (http://phenix.itsudparis.eu/jct/doc_end_user//current_document.php?id=2508), Referred to in Paragraph 0011 of the Specification.

J. Yang et al., "Early Skip Detection for HEVC", JCTVC-G543, Nov. 2011, (http: i /phenix. itsudparis.eu/jct/doc_end_user//current_document.php?id=3800), Referred to in Paragraph 0012 of the Specification.

* cited by examiner

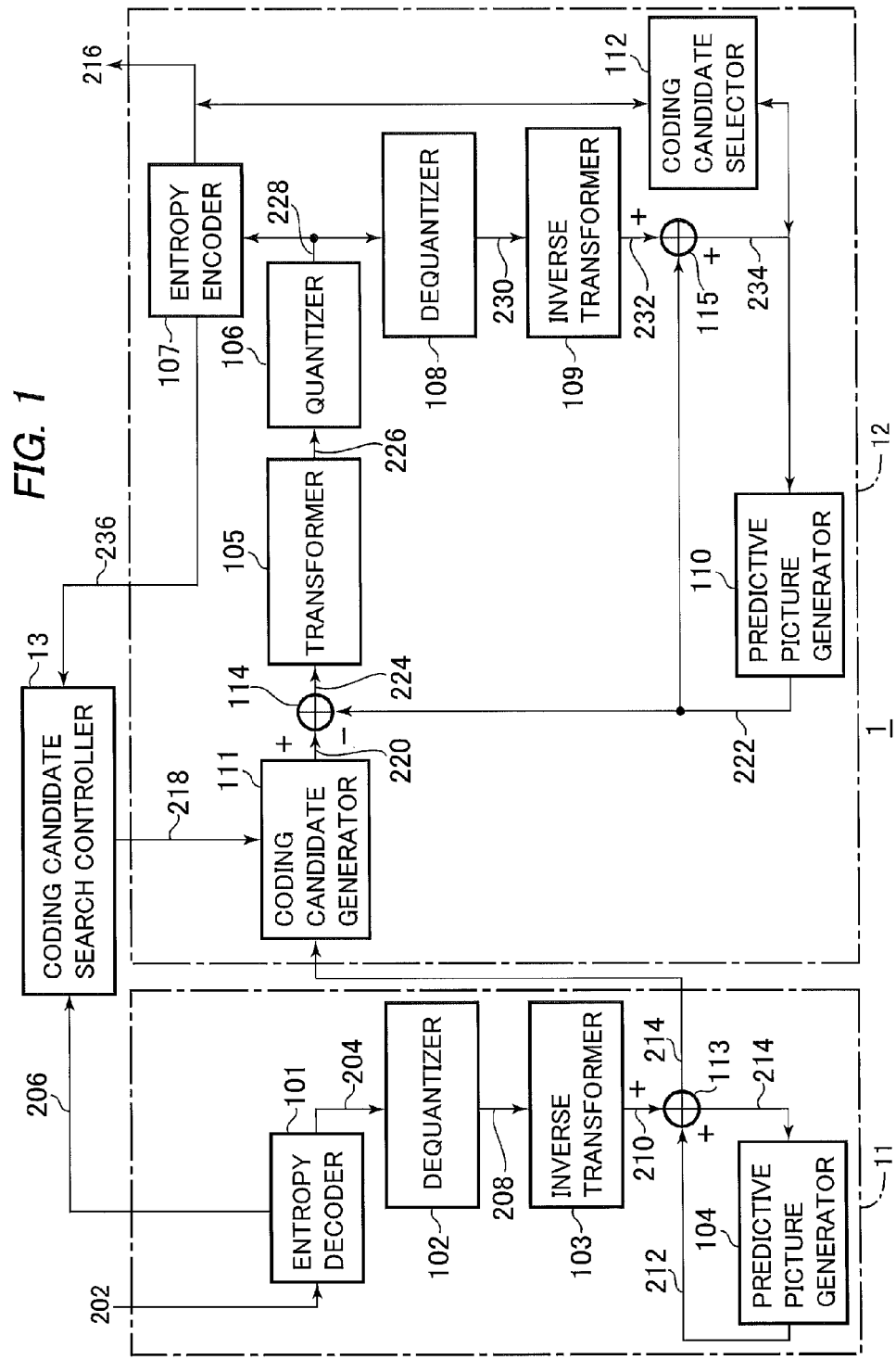

CODING FORMAT CONVERTER PARTIALLY HALTING SEARCH FOR CODING CANDIDATES

BACKGROUND OF THE INVENTION

Field of the Invention

The present invention relates to a coding format converter, and more particularly to a coding format converter for transcoding video streams of different coding formats.

Description of the Background Art

A compression coding of video information based on a video coding format, such as MPEG-2 and H.264/MPEG-4 AVC (Advanced Video Coding) formats, which are standardized by The Moving Picture Experts Group (MPEG), is implemented in such a way that input signals of subject moving pictures are divided into blocks as processing units, for each of which a prediction residual signal, i.e. a difference between a prediction picture with motion predicted and compensated for and an input subject picture, is spatially transformed by, e.g. discrete cosine transform, to thereby obtain transform coefficients, which are in turn quantized and subsequently entropy-encoded, thus attaining high-efficient video compression.

In recent years, a new ISO/IEC (International Organization for Standardization/International Electrotechnical Commission) and ITU-T (International Telecommunication Union Telecommunication Standardization Sector) standard, H.265/MPEG-H HEVC (High Efficiency Video Coding), has been defined to accomplish a better image quality and higher compression efficiency.

According to HEVC, the size of blocks of 16×16 pixels, used as macro-blocks in a conventional video coding format such as AVC, is expanded so as to be able to represent the structure of coding units (CUs), having a block size variable from 8×8 to 64×64 pixels, inclusive, with a quad-tree structure to thereby allow the coding with a variety of block sizes, see FIGS. 2A and 2B.

Moreover, the CU can further be divided in its vertical and/or horizontal directions into several prediction units (PU). The motion compensation prediction and other processing can be performed on subunit regions formed by dividing the CU of 2 N×2 N-pixel block size into the size of 2 N×2 N, 2 N×N or N×N, or an asymmetrical shape, where N is a natural number, see FIGS. 3A, 3B and 3C.

Currently, a variety of video coding formats including HEVC has been used, and thus there have been demands for transcoding techniques applicable to transcoding video streams in different coding formats.

In general, when a video stream is converted from one coding format to another, the video stream in a first coding format, i.e. an input stream, is decoded into data of a decoded picture, which is then encoded into a second coding format.

For example, U.S. Pat. No. 7,526,027 to Sekiguchi et al., discloses a method for performing such transcoding efficiently, in which motion vector information derived from a stream in a first coding format is used to carry out encoding based on a second coding format.

HEVC can implement various combinations of CUs with PUs, unlike conventional coding formats. Therefore, when using HEVC as a second coding format, selection of the optimum one of the various combinations significantly influences the coding efficiency. In order to select the optimum combination, the coding cost, closely associated with the coding efficiency, has to be estimated on a considerable number of combinations of coding format candidates, and it is therefore important how efficiently to search for coding candidates.

By way of example, K. Choi et al., "Coding Tree Pruning Based CU Early Termination", JCTVC-F092, July 2011, (http://phenix.it-Sudparis.eu/jct/doc_end_user//current_document.php?id=2555) teaches a conventional example of solution for dividing CUs, in which the coding costs are evaluated for a given CU size in an inter-prediction mode/intra-prediction mode, when the result of which shows that a skip mode is considered optimum, no search will be conducted for further dividing the CU into a smaller size of blocks.

R. H. Gweon et al., "Early Termination of CU Encoding to Reduce HEVC Complexity", JCTVC-F045, July 2011, (http://phenix.it-Sudparis.eu/jct/doc_end_user//current_document.php?id=2508) teaches a conventional example of solution for dividing PUs, in which the coding is evaluated through the inter-prediction for a given candidate for division into PUs, and when the result of the evaluation shows no prediction residual, which means not proceeding to encoding prediction residual information, no search will be conducted for further candidates for division into PUs.

J. Yang et al., "Early Skip Detection for HEVC", JCTVC-G543, November 2011, (http://phenix.it-Sudparis.eu/jct/doc_end_user//current_do cument.php?id=3800) teaches another conventional example of solution for selecting CU modes, in which coding candidates are evaluated through the inter-prediction for the 2 N×2 N size of PUs, and if the result of the evaluation shows that there are neither motion vector difference nor prediction result information, the search will not be carried out for either of further PU division candidates for the inter-prediction and coding candidates based on the intra-prediction candidates.

Those conventional solutions for reducing the candidates for searching for dividing CUs and PUs are, on one hand, effective in reducing the workload required for the coding processing, and, on the other hand, cause some problems, such as decrease in coding efficiency and deterioration in image quality.

SUMMARY OF THE INVENTION

It is therefore an object of the present invention to provide a coding format converter which enables the reduction in the workload of coding format conversion without significantly reducing the coding efficiency and deteriorating the image quality.

It is a more specific object of the present invention to provide a coding format converter which enables the reduction in the workload of coding format conversion and coding candidates to be searched for without causing the coding efficiency and the image quality to deteriorate.

In accordance with the present invention, there is generally provided a coding format converter converting a picture data stream between first and second coding formats with workload reduced by partially halting searching for coding candidates.

More specifically in accordance with the present invention, a coding format converter for converting an input stream including data of a picture encoded with a first coding format into an output stream including data of a picture encoded with a second coding format comprises a decoder decoding the data of the picture in the input stream with the first coding format to produce resultant data of the picture, an encoder encoding the resultant data of the picture with the second coding format and for searching for a coding candidate to output the coding candidate, and a coding candidate search controller using, for each block of the data obtained by the decoder, first information on prediction residual availability indicative of whether or not residual information is encoded to control the encoder to search for the coding candidate. When a result of the searching shows that the first information for a coding target region of the data to be encoded is indicative of the absence of a residual, the coding candidate search controller halts the search for a coding candidate which depends on second information on residual availability of the coding with the second coding format.

In accordance with the present invention, a non-transitory computer-readable storage medium is also provided which has a coding format converting program stored which controls a computer, when installed and run on the computer, to function as a coding format converter set forth above.

The present invention has advantages in reducing the workload of the coding format conversion, and in moderating the deterioration of coding efficiency and picture quality otherwise caused by the reduction of coding candidates during the searching of coding candidates.

The inventive concept disclosed in the application may also be defined in ways other than in the claims presented below.

The inventive concept may consist of several separate inventions particularly if the invention is considered in light of explicit or implicit subtasks or from the point of view of advantages achieved. In such a case, some of the attributes included in the claims may be superfluous from the point of view of separate inventive concepts. Within the framework of the basic inventive concept, features of different embodiments are applicable in connection with other embodiments.

BRIEF DESCRIPTION OF THE DRAWINGS

The objects and features of the present invention will become more apparent from consideration of the following detailed description taken in conjunction with the accompanying drawings in which:

FIG. 1 is a schematic block diagram showing the configuration of a coding format converter according to a preferred embodiment of the present invention;

DESCRIPTION OF THE PREFERRED EMBODIMENT

Figure 2A:
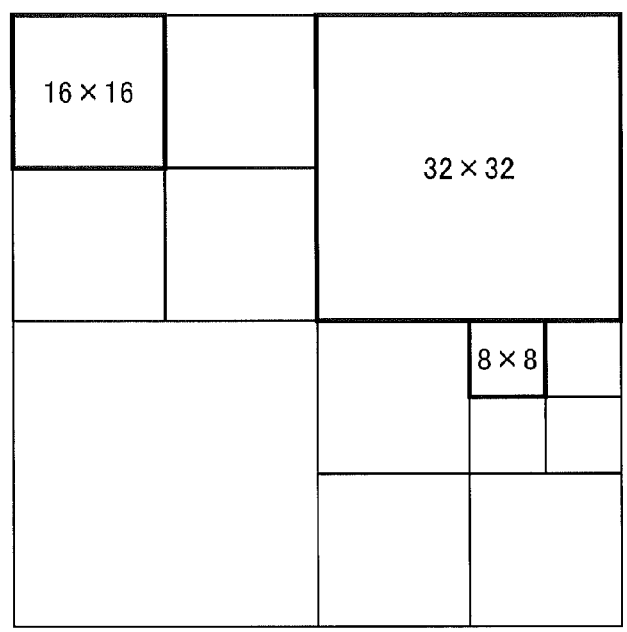
FIGS. 2A and 2B show how to divide coding unit blocks in the H.265/MPEG-H HEVC format.
Figure 2B:
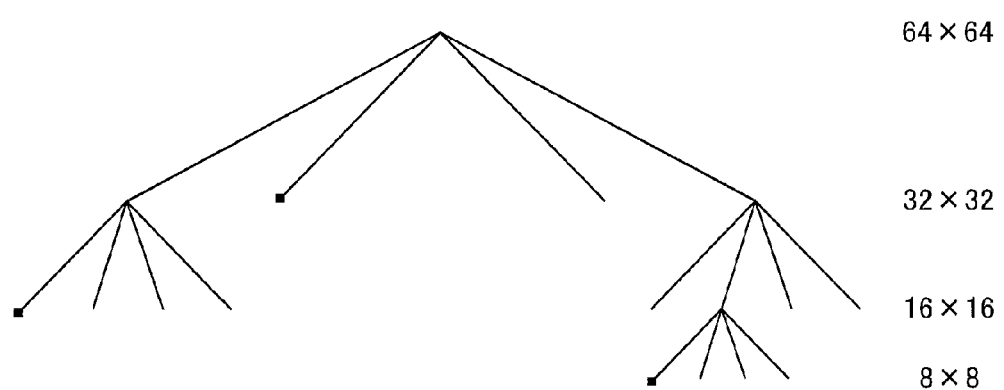

With reference to the accompanying drawings, a preferred embodiment of a coding format converter according to the present invention will now be described in detail. A coding format converter 1 in accordance with the preferred embodiment is configured as shown in FIG. 1.

The coding format converter 1 may be implemented by hardware such as an application-specific integrated circuit (IC) chip on which its constituent components are mounted, or alternatively by software, such as program sequences, run on a processor system including a central processor unit (CPU).

In either case, the functional configuration of the coding format converter 1 may be represented in the form of block diagram as shown in FIG. 1.

In FIG. 1, the coding format converter 1 of the illustrative embodiment generally includes a decoder 11, an encoder 12 and a coding candidate search controller 13, which are interconnected as depicted.

The coding format converter 1 is adapted to decode an input image signal stream 202, which is encoded based on a first coding format, according to the first coding format to obtain data of a resultant picture, and then encode the latter according to a second coding format to thereby produce an output picture in the form of output image signal stream 216, which has thus been converted into the second coding format.

The first coding format can be any video coding formats. For example, an MPEG-2 format, an H.264/MPEG-4 AVC format, an H.265/MPEG-H HEVC format or the like may be applied. The second coding format can also be any video coding formats, such as MPEG-2, H.264/MPEG-4 AVC or H.265/MPEG-H HEVC. The illustrative embodiment is directed to employing H.265/MPEG-H HEVC for the second coding format. The second coding format may be usually different from, or even the same as, the first coding format.

The decoder 11 is adapted to entropy-decode the input stream, encoded with the first coding format, by the first coding format to produce data of a decoded picture to the encoder 12. From the entropy decoding in the decoder 11, also obtained is first information on prediction residual availability that indicates the presence or absence of residual information per block. The first information is delivered from the decoder 11 to the coding candidate search controller 13.

As shown in FIG. 1, the decoder 11 has an entropy decoder 101, a dequantizer 102, an inverse transformer 103, predictive picture generator 104, and an adder 113, which are interconnected as depicted.

The entropy decoder 101 entropy-decodes the input stream 202 to thereby obtain, e.g. transform coefficients, encoding mode information and motion vector information for each of the coding unit blocks. The entropy decoder 101 supplies the dequantizer 102 with transform coefficients 204 thus obtained by the decoding for each of the coding unit blocks.

In an example of the MPEG-2 format applied as the first coding format for encoding input streams 202, the entropy decoder 101 can employ Huffman coding or equivalent. In such a case, the entropy decoder 101 will obtain through calculation 8×8 transform coefficients of discrete cosine transform, inter-prediction information for 16×16- or 8×8-pixel blocks, and the like.

In the case where the input stream 202 is encoded by an AVC format, the entropy decoder 101 can employ a context-based adaptive variable-length coding (CAVLC) format, a context-based adaptive binary arithmetic coding (CABAC) format or the like. The entropy decoder 101 will thus obtain integer transform coefficients of either block size of 4×4 or 8×8 pixels, intra-prediction information predicted by any one of nine modes of a 4×4-pixel block, nine modes of an 8×8-pixel block and four modes of a 16×16-pixel block, as well as inter-prediction information on predicting the motion by any one of seven modes of a 16×16-pixel block.

In the case where the input stream 202 is encoded by an HEVC format, the entropy decoder 101 can employ the CABAC format, thereby obtaining integer transform coefficients of any of block sizes from 4×4 to 32×32 pixels, inclusive, intra-prediction information predicted by any one of thirty-five modes from 4×4 to 64×64, inclusive, and inter-prediction information on predicting the motion by any one of the blocks from 8×4/4×8 to 64×64 pixels, inclusive.

The entropy decoder 101 provides the coding candidate search controller 13 with information, as first information 206 on prediction residual availability for every block, indicative of whether or not the transform coefficients of the discrete cosine transform for every block are encoded into the input stream.

The dequantizer 102 is configured to dequantize the transform coefficients 204 decoded by the entropy decoder 101 according to a quantization parameter.

The inverse transformer 103 is configured to inverse-transform dequantized transform coefficients 208 by inverse discrete cosine transform, for instance, to produce data of a residual picture 210.

The predictive picture generator 104 is for generating a predictive picture 212 by motion compensation, intra-prediction and so on.

The adder 113 is adapted to add the data of the predictive picture 212 generated by the predictive picture generator 104 to the data of the residual picture 210 generated by the inverse transformer 103 to produce data of a decoded picture 214 to the encoder 12.

The encoder 12 is adapted to receive the data of decoded picture 214 decoded by the decoder 11 as data representative of a picture to be encoded to produce output information including a coded picture encoded by the second coding format in the form of output stream 216.

As depicted in FIG. 1, the encoder 12 includes a coding candidate generator 111, a transformer 105, a quantizer 106, an entropy encoder 107, a dequantizer 108, an inverse transformer 109, a predictive picture generator 110, a coding candidate selector 112, a subtractor 114 and an adder 115, which are interconnected as shown.

The coding candidate generator 111 is configured to use control information 218 supplied by the cording candidate search controller 13, which will be described later, to generate a plurality of coding candidates 220, such as a set of information about dividing the blocks of CU sizes and dividing the blocks of PU sizes, and a combination of the inter-prediction and intra-prediction. The coding candidate generator 111, however, does not generate a coding candidate about which the cording candidate search controller 13 has skipped searching, thereby reducing the workload required for searching for candidates.

The subtractor 114 is adapted for producing a predictive residual signal 224, which is a difference between a predictive picture 222 generated through the motion compensation prediction or intra-prediction by the predictive picture generator 110 and a subunit region associated with the coding candidate 220, i.e. target region, generated by the coding candidate generator 111, in the picture to be encoded.

The transformer 105 is adapted to conduct spatial transform, such as discrete cosine transform, on the predictive residual signal 224 supplied by the subtractor 114 to thereby obtain transform coefficients 226.

The quantizer 106 is designed to quantize the transform coefficients 226 or the like, obtained by the special transform performed in the transformer 105, according to a quantization parameter for the second coding format. The quantizer 106 supplies the transform coefficients 228 thus obtained to the entropy encoder 107 and the dequantizer 108.

The dequantizer 108 is adapted to dequantize the transform coefficients 228, quantized by the quantizer 106, according to a quantization parameter for the second coding format.

The inverse transformer 109 is adapted for conducting inverse transform, such as the inverse discrete cosine transform or the like, on the transform coefficients 230 obtained by the dequantization by the dequantizer 108 to produce data of a residual picture 232.

The predictive picture generator 110 is adapted to perform the motion compensation, the intra-predication or the like to thereby produce data of a predictive picture 222. The predictive picture generator 110 provides the produced data of predictive picture 222 to the subtractor 114 and the adder 115.

The adder 115 is adapted for adding the predictive picture 222 produced by the predictive picture generator 110 to the residual picture 232 produced by the inverse transformer 109 to thereby generate data of a decoded picture 234 which can be obtained when the output stream is decoded by a decoder with the second coding format. The decoded picture 234 is supplied to the predictive picture generator 110 as data of a reference picture for use in coding pictures following thereto.

The entropy encoder 107 is configured to encode the transform coefficients 228, quantized by the quantizer 106, according to an entropy coding format to output resultant data as an output stream 216 associated with that coding candidate, together with information on dividing the CUs and the motion vector information and prediction mode information used by the predictive picture generator 110.

In the case where the second coding format is the HEVC format, the CABAC format can be applied, for instance. In the case where the second coding format is the MPEG-2 format, the Huffman coding can be applied. When the second coding format is the AVC format, the CAVLC, CABAC or similar format can be applied.

The coding candidate selector 112 is adapted to estimate a coding cost, or rate-distortion cost, which would be incurred when each of plural coding candidates generated by the coding candidate generator 111 is subjected to coding process, so as to select a coding candidate with optimum cost.

The coding candidate search controller 13 is configured to use the first information 206 on prediction residual availability derived by the entropy decoder 101 in the decoder 11 and second information 236 on prediction residual availability obtained by the coding cost estimation for the coding candidates performed in the encoder 12 to control the search for the plural coding candidates, such as combinations of the CUs and PUs, generated by the coding candidate generator 111.

In operation, an image data stream 202 encoded by the first coding format is input to the decoder 11. In the decoder 11, the entropy decoder 101 entropy-decodes the input stream 202 to thereby obtain, for example, transform coefficients of discrete cosine transform, coding mode information, and motion vector information.

The transform coefficients 204 obtained by the entropy decoder 101 as described above are dequantized and inverse-transformed by the dequantizer 102 and the inverse transformer 103, respectively, and supplied to the adder 113. The adder 113 adds the predictive picture 212 generated by the motion compensation and intra-prediction by the predictive picture generator 104 to the residual picture 210 supplied by the inverse transformer 103 to thereby derive the decoded picture 214.

The decoded picture 214 derived by the adder 113 is supplied to the encoder 12 as a picture to be encoded in the second coding format and also to the predictive picture generator 104 as a reference picture for use in decoding input streams following thereto.

In the decoder 11, information about whether or not the transform coefficients of discrete cosine transform or the like obtained for each block through the entropy decoding were encoded into residual information is fed from the entropy decoder 101 to the coding candidate search controller 13 as the first information on the availability of prediction residual for that block.

The encoder 12 receives the data of the decoded picture 214 input as a picture to be encoded from the decoder 11, and encodes the decoded picture according to the second coding format.

In the encoder 12, the coding candidate generator 111 divides the decoded picture 214 input from the decoder 11 for each of the coding candidates, i.e. the combinations of CUs and PUs.

The subtractor 114 produces the predictive residual signal 224, which is a difference between the predictive picture 222 generated through the motion compensation prediction or intra-prediction by the predictive picture generator 110 and a subunit region associated with the coding candidate 220 in the input decoded picture. The transformer 105 calculates transform coefficients 226 by the spatial transform, such as discrete cosine transform. The quantizer 106 quantizes the transform coefficients 226 resultant from the spatial transform to thereby produce quantized transform coefficients 228.

The quantized transform coefficients 228 thus obtained by the quantizer 106 is entropy-encoded by the entropy encoder 107 with, for instance, a variable-length code or arithmetic code. Information derived by the entropy encoding is output as the output stream 216, together with the motion vector information and the prediction mode information used in the predictive picture generator 110.

The quantized transform coefficients 228 are dequantized and invers-transformed by the dequantizer 108 and the inverse transformer 109, respectively. The residual picture 232 thus inverse-transformed is added by the adder 115 to the predictive picture 222 supplied from the predictive picture generator 110. Resultantly, a decoded picture is produced which can be obtained when decoding an output stream by a decoder with the second coding format. The picture output from the adder 115 is supplied to the predictive picture generate 110 as a reference picture for use in coding subsequent pictures.

The entropy encoder 107 entropy-encodes the transform coefficients 228 quantized by the quantizer 106 to output resultant data as a data stream 216 associated with the coding candidate, inclusive of information on dividing the CUs, the motion vector information and prediction mode information used by the predictive picture generator 110.

The entropy encoder 107 may be configured to avoid from assembling a data stream during the search for coding candidates. Instead, the entropy encoder 107 may calculate, for each candidate, only a code amount that is needed for a data stream associated with that coding candidate, and produce a data stream actually after the coding candidate selector 112 has selected a coding candidate. More specifically, during the search for coding candidates, the entropy encoder 107 calculates, for each coding candidate, the amount, or rate, of code required for a data stream, and uses a result of the search to produce, for each coding candidate, information indicative of the presence or absence of a residual signal as second information 236 on prediction residual availability to the coding candidate search controller 13.

The quantized transform coefficients 228 are dequantized by the dequantizer 108 and inverse-transformed by the inverse transformer 109. Information resultant from the dequantization and inverse transform is added to the predictive picture 222 supplied from the predictive picture generator 110 by the adder 115 to thereby generate the decoded picture 234 which can be obtained when decoding a data stream associated with a coding candidate by a decoder with the second coding format.

When searching for coding candidates, a distortion between the decoded picture 234 obtained by the adder 115 and a subunit region associated with the coding candidate in the decoded picture of the first coding format supplied from the decoder 11 is used to estimate the coding cost. The decoded picture 234 of the second coding format selected by the coding candidate selector 112 is supplied to the predictive picture generator 110 as a reference picture for inter-prediction for use in coding subsequent pictures.

The coding candidate generator 111 generates several coding candidates, e.g. a combination of divisions of the CUs and the PUs, and a combination of the inter-prediction and the intra-prediction.

Now, a description will be made about how the coding candidate generator 111 generates coding candidates. For example, the coding candidate generator 111 may simply be adapted for searching coding unit blocks, starting from a CU having its size largest thereamong recursively toward the smallest, for an inter/intra coding candidate of a CU having a given block size and a candidate for a division into PUs, and then recursively obtaining, for each CU, a coding candidate available when dividing that CU into smaller ones.

The coding candidate selector 112 estimates a coding cost, or rate-distortion cost, incurred with the above-described coding processing on each coding candidate generated by the entropy encoder 107 so as to select a data stream associated with a coding candidate having its coding cost optimum. The entropy encoder 107 outputs as the output stream 216 the data stream associated with the coding candidate having the optimum coding cost thus selected by the coding candidate selector 112. For example, the coding candidate selector 112 estimates a coding cost based on the distortion between the decoded picture 234 and a subunit region associated with the coding candidate in the decoded picture of the first coding format supplied from the decoder 11, and based on the coding amount, or rate, required for a stream associated with the coding candidate.

The coding candidate search controller 13 uses the first information on prediction residual availability 206 supplied by the decoder 11 and the second information on prediction residual availability 236 supplied by the encoder 12 to control the generation of plural coding candidates, such as combinations of CUs and PUs generated by the coding candidate generator 111.

Figure 3A:
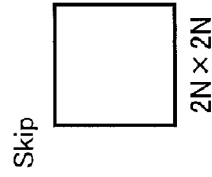
FIGS. 3A, 3B and 3C show how to divide coding unit blocks into prediction units in the H. 265/MPEG-H HEVC format.
Figure 3B:
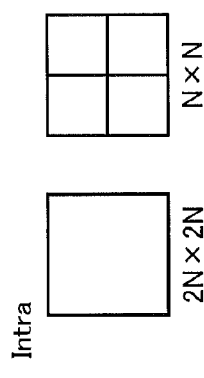
Figure 3C:
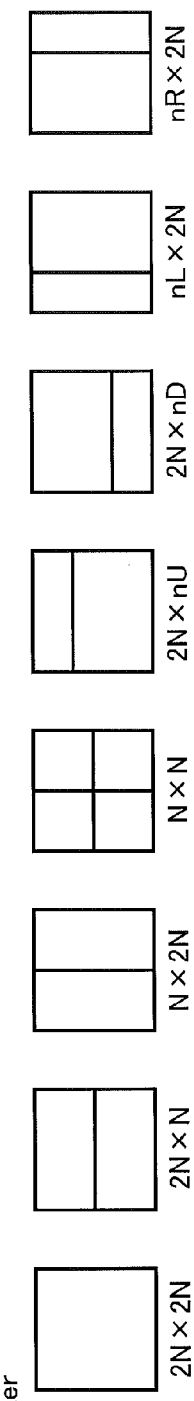

In regard to combinations of CUs and PUs, the coding cost may be estimated for every combination to select the optimum candidate to thereby increase coding efficiency. As shown in FIG. 2A, however, the CUs are of various block sizes, and as shown in FIGS. 3A, 3B and 3C, there are various combinations of dividing a CU into PUs, so that there is an enormous number of combinations of CUs and PUs. Consequently, the workload caused by estimating the coding costs and selecting the optimum coding candidate would be huge. By contrast, as with the conventional solutions, if the number of coding candidates were reduced by using only the second information on prediction residual availability obtained by evaluating the coding candidates, then the procedure carried out by an HEVC format or the like would determine that residual information is missing although a predictive picture has to be corrected by using residual information because the HEVC format conducts the conversion and quantization on a residual signal in a different way from that of the present invention. As a consequence, when correction is required with residual information on a predictive picture, the correction based on the residual information could not be performed, thus resulting in deterioration of the picture.

Thus, in the illustrative embodiment, the coding candidate search controller 13 is adapted to use not only the second information 236 on prediction residual availability but also the first information 206 on prediction residual availability to determine whether to generate coding candidates in connection with the search, depending on the second information 236 on prediction residual availability. Namely, the generation of coding candidates may be refrained from, depending on the second information 236 on prediction residual availability.

The coding candidate search controller 13 may refrain from the generation of coding candidates in various ways. For example, for a block having a given CU size, inter-coding candidates and intra-coding candidates are searched for. If the search result shows that second information on prediction residual availability in the optimum coding mode in the block having CU size of interest is indicative of the absence of residual, and furthermore all of first information on prediction residual availability associated with the unit regions of the CU of interest are indicative of the absence of residuals, then the coding candidate search controller 13 halts the generation of coding candidates for the block of interest, which will further be divided into smaller CUs, for which coding candidates will be generated. In other words, the coding candidate search controller 13 refrains from recursively dividing the CU and searching for candidates for the smaller CUs.

In another example, for a given CU, an inter-coding candidate is searched for. If the result of the search shows that the second information on prediction residual availability, which is the estimation result of the coding candidate for PUs of the sizes, e.g. 2 N×2 N, 2 N×N and N×2 N, into which the CU of interest is divided, is indicative of the absence of the residual and that every first information on prediction residual availability associated with subunit regions in that CU is indicative of the absence of the residual, then the coding candidate search controller 13 halts the further generation of coding candidates for division of blocks, i.e. PUs, of the remaining sizes. That is, the coding candidate search controller 13 refrains from searching for coding candidates for PUs of the remaining sizes.

In yet another example, when searching for coding candidates for CUs of a given size, the coding candidate search controller 13 first searches for 2 N×2 N inter-coding candidates for the PUs forming the entire CU. If the searching results in that the second information on prediction residual availability, which is the result of evaluating the 2 N×2 N coding candidates, is indicative of the absence of residual, and also that every first information on prediction residual availability associated with the subunit regions in this CU is indicative of the absence of the residual, then the coding candidate search controller 13 refrains from generating an inter-prediction candidate and an intra-prediction candidate for a plurality of PUs into which the CU of interest is divided. This means that the coding candidate search controller 13 halts the searching for other coding candidates for the block of the same size as that CU.

Any of those three ways of refrainment of generating coding candidates may be carried out alone or selectively combined. In addition, the coding candidate search controller 13 can be configured to have any of those ways set alone or selectable by the user.

In summary, the coding format converter 1 according to the illustrative embodiment can conducting a data stream of the first coding format into another data stream of the second coding format. The coding format converter 1 of the illustrative embodiment is advantageous in reducing the workload of searching for coding candidates during coding format conversion, and in moderating the deterioration of coding efficiency and picture quality otherwise caused by the reduction of coding candidates during the searching of coding candidates. Hence, the coding format converter 1 may be designed with lower throughput in coding format conversion.

Although some modifications have been described above in connection with the illustrative embodiment, the present invention can also be applied in the following manners.

For example, the present invention may not be limited to the application of transcode processing between different coding formats, but can be applied to transcode processing, such as bit-rate conversion or resolution conversion, even on the same coding format.

The above-described illustrative embodiment is directed to using information on the presence or absence of prediction residual as information derived from an input data stream of the first coding format. The present invention may derive information on motion vector or coding mode from an input data stream so as to efficiently encode the data according to the second coding format.

In the illustrative embodiment, the present invention is implemented as the coding format converter, which may be a standalone device. By way of example, however, the coding format converter may be implemented in the form of processor systems, such as a personal computer, a tablet terminal, a mobile phone, a smartphone, a video computer, a PDA personal digital assistant), a television set, a set-top box or a digital camera. Alternatively, a CPU mounted on an apparatus may run program sequences implementing the coding format converter according to the present invention.

The coding format converter according to the present invention can be implemented not only in the form of single device but a plurality of devices operative cooperatively with each other. In addition, the coding format converter according to the invention can be implemented in a form connectable to a telecommunications network as typified by the Internet so as to receive an input stream over the network and convert the coding format of the received stream.

An apparatus equipped with a coding format converter of the invention may be adapted to receive an input stream from a recording medium, e.g. a recoding disc such as a DVD (Digital Video Disc), a Blue-Ray (trademark) disc or a flash memory device, or from a video system, e.g. a digital video camera, and in turn to output an output image on a display device or record it on another recording medium or disc.

The entire disclosure of Japanese patent application No. 2014-64164 filed on Mar. 26, 2014, including the specification, claims, accompanying drawings and abstract of the disclosure, is incorporated herein by reference in its entirety.

While the present invention has been described with reference to the particular illustrative embodiment, it is not to be restricted by the embodiment. It is to be appreciated that those skilled in the art can change or modify the embodiment without departing from the scope and spirit of the present invention.

What is claimed is:

1. A coding format converter for converting an input stream including data of a picture encoded with a first coding format into an output stream including data of a picture encoded with a second coding format, comprising:
   a decoder decoding the data of the picture in the input stream with the first coding format to produce resultant data of the picture;
   an encoder encoding the resultant data of the picture with the second coding format and searching for a coding candidate to output the coding candidate; and
   a coding candidate search controller using, for each block of the data obtained by said decoder, first information on prediction residual availability indicative of whether or not residual information is encoded to control said encoder to search for the coding candidate,
   wherein, when a result of the searching shows that the first information for a coding target region of the data to be encoded is indicative of an absence of a residual, said coding candidate search controller halts the search for a coding candidate which depends on second information on residual availability of the coding with the second coding format.

2. The converter in accordance with claim 1, wherein, when the second information in an optimum coding mode for a region of a size corresponding to a coding unit is indicative of the absence of a residual during searching, and further when the first information in the target region associated with a region of the coding unit is indicative of the absence of a residual, said coding candidate search controller halts the search for a coding candidate for a smaller coding unit into which the target region of the coding unit is divided.

3. The converter in accordance with claim 1, wherein the second information represents the residual availability of an inter-prediction candidate for a region of a prediction unit into which the region of the coding unit is divided,
   when the second information on the residual availability of the inter-prediction candidate for the region of the prediction unit is indicative of the absence of a residual, and further when the first information on residual availability in the target region associated with the region of the coding unit is indicative of the absence of a residual, the coding candidate search controller halts the search for another inter-prediction candidate for the region of the prediction unit into which the region of the coding unit is divided.

4. The converter in accordance with claim 1, wherein the second information on residual availability represents an inter-coding candidate, of which the region of the prediction unit covers the entire region of the coding unit,
   when the second information on residual availability representing the inter-coding candidate is indicative of the absence of a residual, and further when the first information on residual availability for the target region associated with the region of the coding unit is indicative of the absence of a residual, said coding candidate search controller halts the search for the inter-prediction candidate and an intra-prediction candidate for the region of a plurality of prediction units into which the region of the coding unit is divided.

5. The converter in accordance with claim 1, wherein said decoder extracts from the input stream motion vector information and coding mode information of the decoded picture in addition to the first information to supply the extracted information to said encoder,
   the encoder utilizing the motion vector information and the coding mode information in the encoding according to the second coding format.

6. The converter in accordance with claim 1, wherein the first coding format or the second coding format is compliant with an H.264/MPEG-4 AVC standard.

7. The converter in accordance with claim 1, wherein the first coding format or the second coding format is compliant with an H.265/MPEG-H HEVC standard.

8. A non-transitory computer-readable storage medium having a coding format converting program stored which converts, when installed and run on a computer, an input stream including data of a picture encoded with a first coding format into an output stream including data of a picture encoded with a second coding format to control the computer to function as:
   a decoder decoding the data of the picture in the input stream with the first coding format to produce resultant data of the picture;
   an encoder encoding the resultant data of the picture with the second coding format, and for searching for a coding candidate to output the coding candidate; and
   a coding candidate search controller using, for each block of the data obtained by said decoder, first information on prediction residual availability indicative of whether or not residual information is encoded to control said encoder to search for the coding candidate,
   said coding candidate search controller halting, when a result of the search shows that the first information for a coding target region of the data to be encoded is indicative of an absence of a residual, the search for a coding candidate which depends on second information on residual availability of the encoding with the second coding format.

* * * * *